(12) United States Patent
Miyagawa

(10) Patent No.: US 9,256,293 B2
(45) Date of Patent: Feb. 9, 2016

(54) BUTTON KEY ASSEMBLY, OPERATION PANEL, AND IMAGE FORMING APPARATUS

(71) Applicant: KYOCERA Document Solutions Inc., Osaka-shi, Osaka (JP)

(72) Inventor: Tomoo Miyagawa, Osaka (JP)

(73) Assignee: Kyocera Document Solutions Inc., Osaka (JP)

(*) Notice: Subject to any disclaimer, the term of this patent is extended or adjusted under 35 U.S.C. 154(b) by 371 days.

(21) Appl. No.: 13/718,546

(22) Filed: Dec. 18, 2012

(65) Prior Publication Data

US 2013/0154939 A1 Jun. 20, 2013

(30) Foreign Application Priority Data

Dec. 19, 2011 (JP) ................................ 2011-276685

(51) Int. Cl.
*G06F 3/02* (2006.01)
*H01H 13/807* (2006.01)

(52) U.S. Cl.
CPC ............... *G06F 3/02* (2013.01); *H01H 13/807* (2013.01); *H01H 2221/044* (2013.01); *H01H 2221/054* (2013.01); *H01H 2221/056* (2013.01); *H01H 2233/004* (2013.01); *H01H 2235/006* (2013.01)

(58) Field of Classification Search
CPC ....... G06F 3/02; G06F 3/0202; H01H 13/807; H01H 2235/006; H01H 2221/044; H01H 2233/004
USPC .......................................................... 345/168
See application file for complete search history.

(56) References Cited

U.S. PATENT DOCUMENTS

| 8,618,429 | B2 * | 12/2013 | Sugawara | ...................... 200/5 A |
| 2003/0095106 | A1 * | 5/2003 | Wang et al. | ................... 345/168 |
| 2003/0221940 | A1 | 12/2003 | Sunadome | |
| 2005/0015789 | A1 * | 1/2005 | Pen | ............................... 720/646 |
| 2007/0139357 | A1 * | 6/2007 | Wang et al. | ................... 345/104 |

(Continued)

FOREIGN PATENT DOCUMENTS

DE 102 03 400 C1 6/2003
DE 10 2006 034 850 B3 11/2007

(Continued)

OTHER PUBLICATIONS

Japanese Office Action, Japanese Patent Application No. 2011-276685 dated Oct. 22, 2013.
Extended European Search Report, European Application No. 12197318.4, Apr. 8, 2013.

*Primary Examiner* — Kumar Patel
*Assistant Examiner* — Afroza Chowdhury
(74) *Attorney, Agent, or Firm* — Arent Fox LLP

(57) ABSTRACT

A button key assembly of an operation panel includes button key units. Each button key unit includes button keys and a frame member. The button keys are arranged corresponding to switches on a substrate provided at the operation panel. The frame member supports the button keys via elastic arm members. The button key units are superposed one over the other to form the button key assembly. At least one of the button key units includes a supporting space having a width sufficient for supporting the button keys via the elastic arm members, and a vacant space disposed adjacent to the supporting space on a side closer to the elastic arm members and having a width narrower than the width of the supporting space. A button key of another button key unit superposed on the at least one button key unit is arranged in the vacant space.

5 Claims, 13 Drawing Sheets

(56) References Cited

U.S. PATENT DOCUMENTS

| | | |
|---|---|---|
| 2007/0209921 A1 | 9/2007 | Li et al. |
| 2008/0173528 A1 | 7/2008 | Izumi |
| 2009/0038919 A1 | 2/2009 | Matsuo |
| 2009/0322569 A1 | 12/2009 | Haruyama |
| 2010/0116637 A1* | 5/2010 | Kano .......................... 200/5 A |
| 2011/0100791 A1* | 5/2011 | Zhu et al. .................... 200/5 A |
| 2012/0132509 A1 | 5/2012 | Sugawara |

FOREIGN PATENT DOCUMENTS

| | | |
|---|---|---|
| JP | 06-208818 A | 7/1994 |
| JP | 10-294044 A | 11/1998 |
| JP | 2008-153169 A | 7/2008 |
| JP | 4560569 B2 | 7/2010 |
| JP | 2012-114020 A | 6/2012 |

* cited by examiner

BUTTON KEY ASSEMBLY, OPERATION PANEL, AND IMAGE FORMING APPARATUS

INCORPORATION BY REFERENCE

This application is based upon and claims the benefit of priority from the corresponding Japanese Patent Application No. 2011-276685, filed in the Japan Patent Office on Dec. 19, 2011, the entire contents of which are incorporated herein by reference.

BACKGROUND

The present disclosure relates to a button key assembly in which button keys are attached to a frame member via elastic arm members, an operation panel including the button key assembly, and an image forming apparatus including the operation panel.

An operation panel has heretofore been provided in an image forming apparatus, such as a copying machine, facsimile machine, and multi-function machine, for setting various functions of the apparatus. Arranged in the operation panel are a display unit including a liquid crystal display, which displays status of operations and settings of an apparatus, and a plurality of button keys for setting various functions, for example. In addition, the operation panel includes a button key assembly where the button keys are arranged.

Conventional button key assemblies of this kind are known, such as those integrally forming a plurality of button keys that is arranged in the lateral direction at the same height by connecting the button keys to a frame member via plastic arm members, and those independent button keys arranged individually.

Since an elastic arm member is formed horizontally between adjoining button keys, the above conventional button key assemblies pose a problem that it is difficult to decrease a pitch between the adjoining button keys and downsize the operation panel.

In addition, since the number of the components and the number of steps of assembly work increase if the independent button keys are arranged individually, a problem rises that it is difficult to implement cost down measures for the apparatus.

SUMMARY

In an aspect of the present disclosure, a button key assembly of an operation panel including a plurality of button key units is provided. Each button key unit includes a plurality of button keys and a frame member. The plurality of button keys is arranged corresponding to a plurality of switches on a substrate provided at the operation panel. The frame member is configured to support the plurality of button keys via elastic arm members. The plurality of button key units is superposed one over the other to form the button key assembly. At least one of the plurality of button key units includes a supporting space configured to have a width sufficient for supporting the plurality of button keys via the elastic arm members, and a vacant space configured to be adjacent to the supporting space on a side closer to the elastic arm members and to have a width narrower than the width of the supporting space. A button key of another button key unit superposed on the at least one button key unit is arranged in the vacant space.

In another aspect of the present disclosure, an operation panel is provided, which includes the button key assembly described above.

In another aspect of the present disclosure, an image forming apparatus is provided, which includes the operation panel described above.

DETAILED DESCRIPTION

Hereafter, an embodiment of the present disclosure will be described with reference to FIGS. 1-13. It should be noted that the directions indicating rear, front, right and left will be described based on the reference in which an image forming apparatus 1 is viewed from the front for the sake of convenience in the following description.

Figure 1:
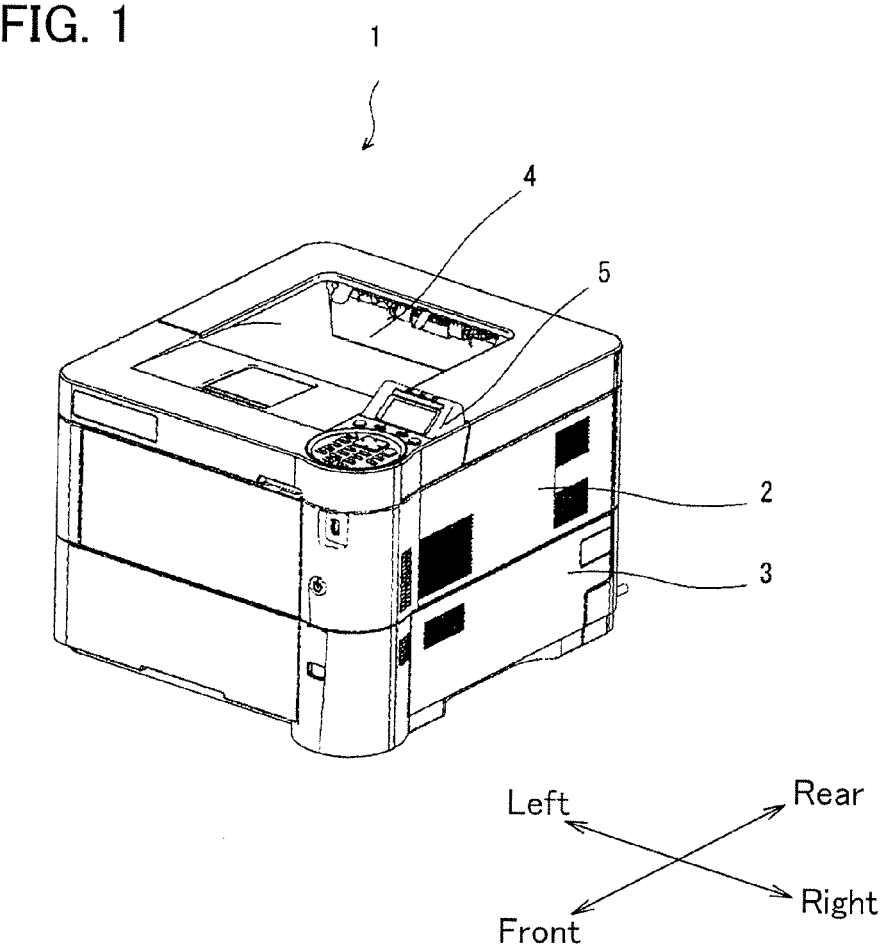
FIG. 1 is a perspective view showing an image forming apparatus including a button key assembly of an operation panel according to an embodiment of the present disclosure.

FIG. 1 is a perspective view showing the image forming apparatus 1 including a button key assembly according to the embodiment of the present disclosure. A direction running diagonally lower left in FIG. 1 corresponds to a front side of the image forming apparatus 1. The image forming apparatus 1 includes a main body 2 to form images, and an attachable feed unit 3 connected at a lower part of the main body 2. A discharging unit 4 for discharging a sheet of paper, which has conveyed from the feed unit 3 to the main body 2 and printed, is provided at the center and upper portion of the main body 2. In addition, an operation panel 5 for performing, for example, settings of various functions of the image forming apparatus 1 is provided at a corner portion of a front side of the image forming apparatus 1. It should be noted that, although one tier of the feed unit 3 is shown in FIG. 1, a plurality of tiers of feed units 3 may be provided at a lower part of the main body 2.

Figure 2:
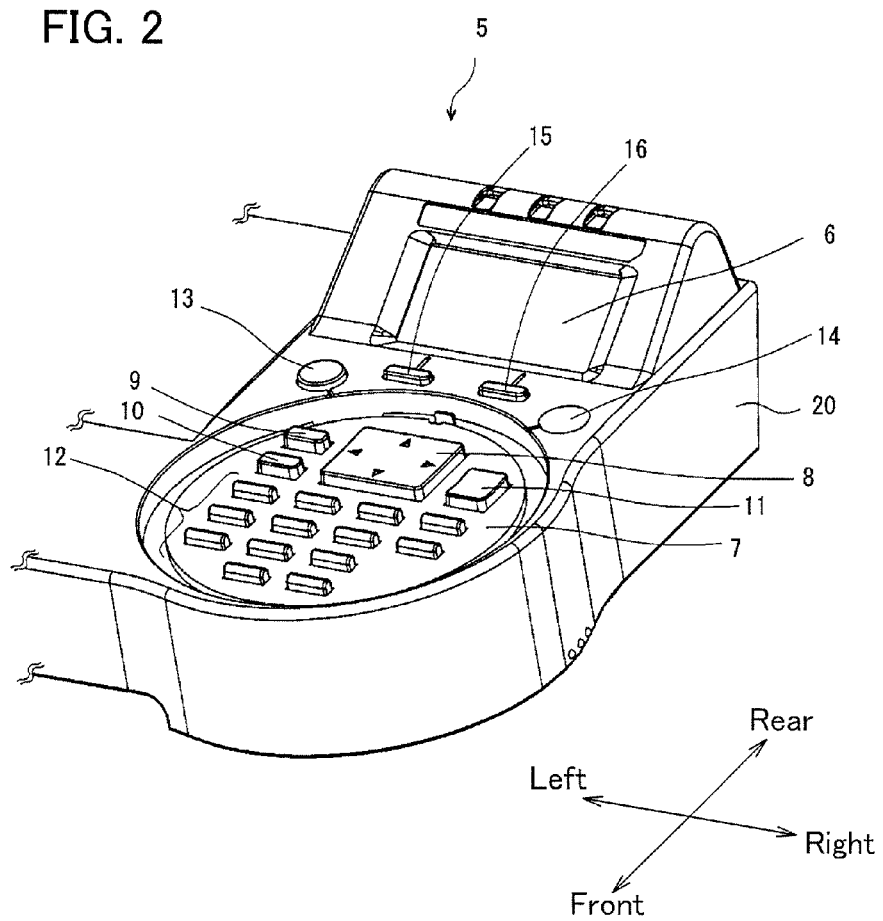
FIG. 2 is a perspective view showing an operation panel including a button key assembly according to the embodiment of the present disclosure.

As shown in FIG. 2, a display unit 6 is provided at a rear portion of the operation panel 5 while it is positioned to be slant in a front-rear direction. The display unit 6 includes, for example, a liquid crystal display to display the status of operations and settings of the image forming apparatus 1. In addition, a concave portion 7 of a circular shape is formed in the operation panel 5 at a front side of the display unit 6. A plurality of button keys of various kinds for setting functions of the image forming apparatus 1 is arranged inside and outside the concave portion 7.

In the present embodiment, an up/down/right/left operation key 8 of a rectangular shape is arranged at a center and rear side inside the concave portion 7. Two first button keys 9 and 10 of an oblong rectangular shape are arranged in parallel with each other in two rows at a left side of the up/down/right/left operation key 8. A second button key 11 of a rectangular shape smaller than the up/down/right/left operation key 8 is arranged at a right side thereof. In addition, thirteen pieces of third button key 12 of an oblong rectangular shape, such as numerical keys of 0-9 and symbol keys like # are arranged in four rows and four columns at a front side of the up/down/right/left operation key 8 inside the concave portion 7.

Furthermore, a menu key 13 of a circular shape is arranged at a front left side of the display unit 6 and a cancel key 14 of a circular shape is arranged at a front right side of the display unit 6, outside the concave portion 7. Two second button keys 15 and 16 of a horizontally oblong rectangular shape are arranged in parallel with each other to the right and left between the menu key 13 and the cancel key 14.

The operation panel 5 has a button key assembly including a substrate 17 (refer to FIG. 3), a first button key unit 18 (refer to FIG. 5) superposed on the substrate 17, and a second button key unit 19 (refer to FIG. 8) superposed on the first button key unit 18. This button key assembly is covered with a cover 20 (refer to FIG. 2) formed at a front side of the main body 2.

Figure 3:
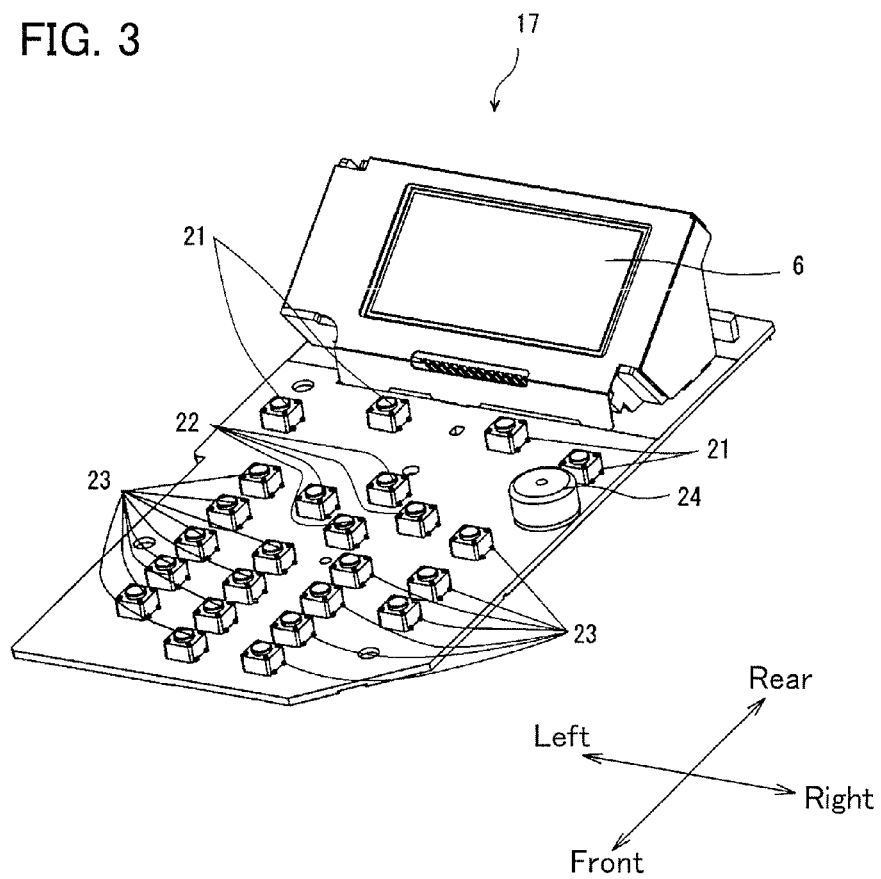
FIG. 3 is a perspective view showing a substrate in the button key assembly of the operation panel according to the embodiment of the present disclosure.
Figure 4:
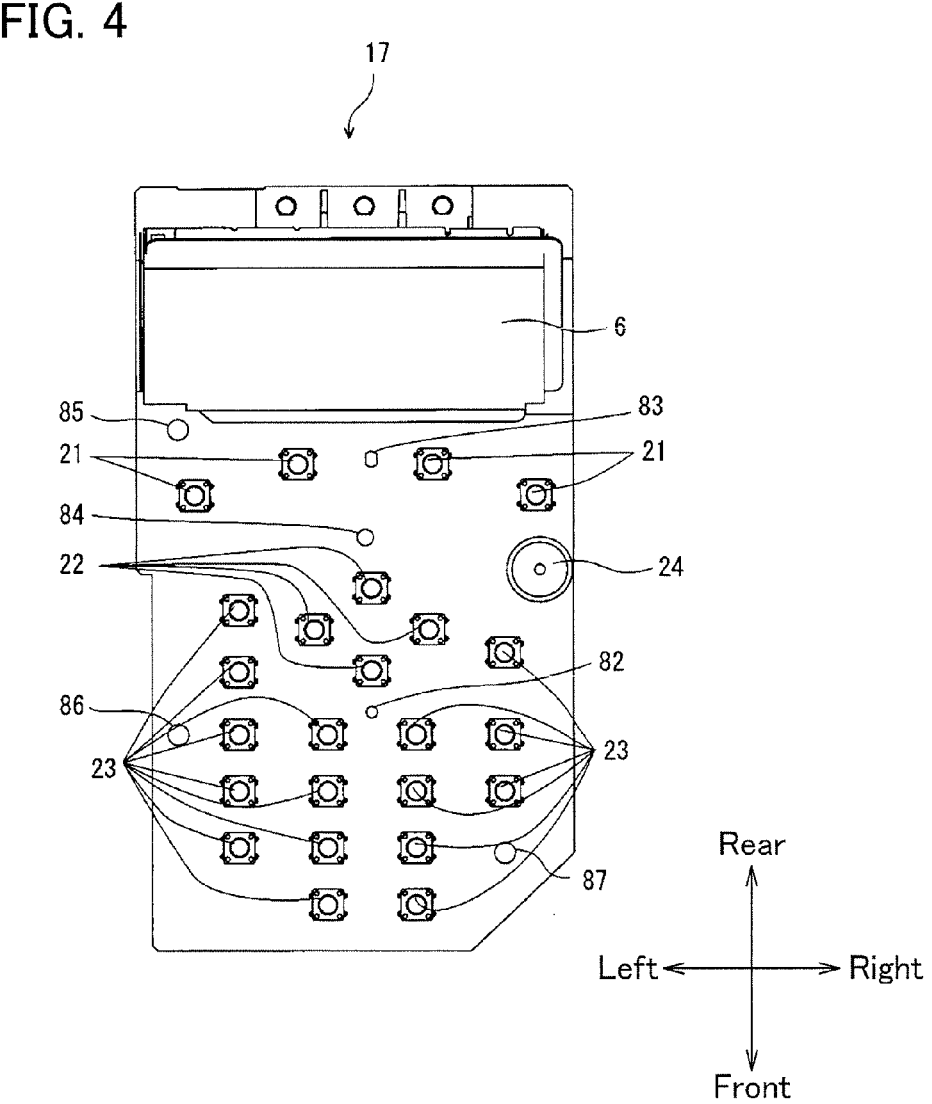
FIG. 4 is a plan view showing the substrate in the button key assembly according to the embodiment of the present disclosure.

As shown in FIG. 3 and FIG. 4, the display unit 6 is attached to the substrate 17 at a rear side, and a plurality of switches is arranged at a front side. Among the switches, four pieces of tact switches 21 of a substantially rectangular parallelepiped arranged sequentially from the left side in proximity to the display unit 6 are provided corresponding to the menu key 13, the second button keys 15 and 16, and the cancel key 14 (refer to FIG. 2), respectively. In addition, four pieces of tact switches 22 of a substantially rectangular parallelepiped arranged in a lozenge-like shape at a substantially center portion correspond to the up/down/right/left operation key 8 (refer to FIG. 2). Sixteen pieces of tact switches 23 of a substantially rectangular parallelepiped, which are arranged at right and left sides and at a front side of the tact switches 22 in four right-left columns, are provided corresponding to the first button keys 9 and 10, the second button key 11, and the third button keys 12 (refer to FIG. 2), respectively. Furthermore, a buzzer 24 of a substantially cylindrical shape is arranged at a front side of a tact switch 21 at a right end. In addition, as shown in FIG. 4, positioning holes 82 and 83 for positioning the substrate 17 with respect to the first button key unit 18, and mounting holes 84, 85, 86, and 87 for fixing the substrate 17 onto the cover 20 with screws are formed on the substrate 17. The mounting hole 84 is a circular hole having substantially the same diameter with a screw, and the mounting holes 85, 86, and 87 are holes each having a larger diameter than that of a screw.

Figure 5:
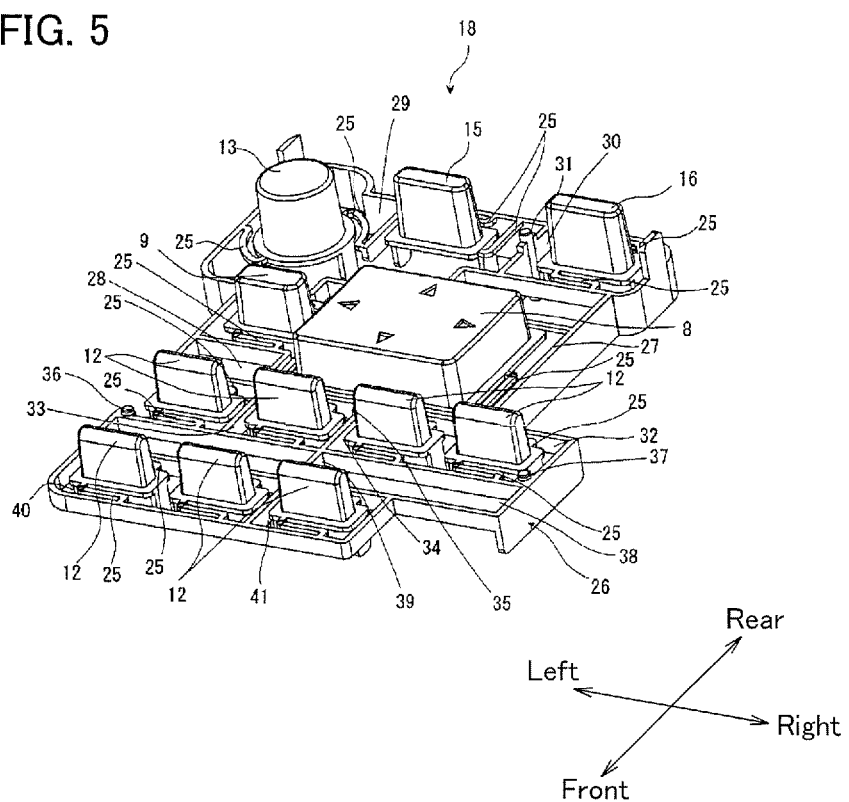
FIG. 5 is a perspective view showing a first button key unit in the button key assembly according to the embodiment of the present disclosure.
Figure 6:
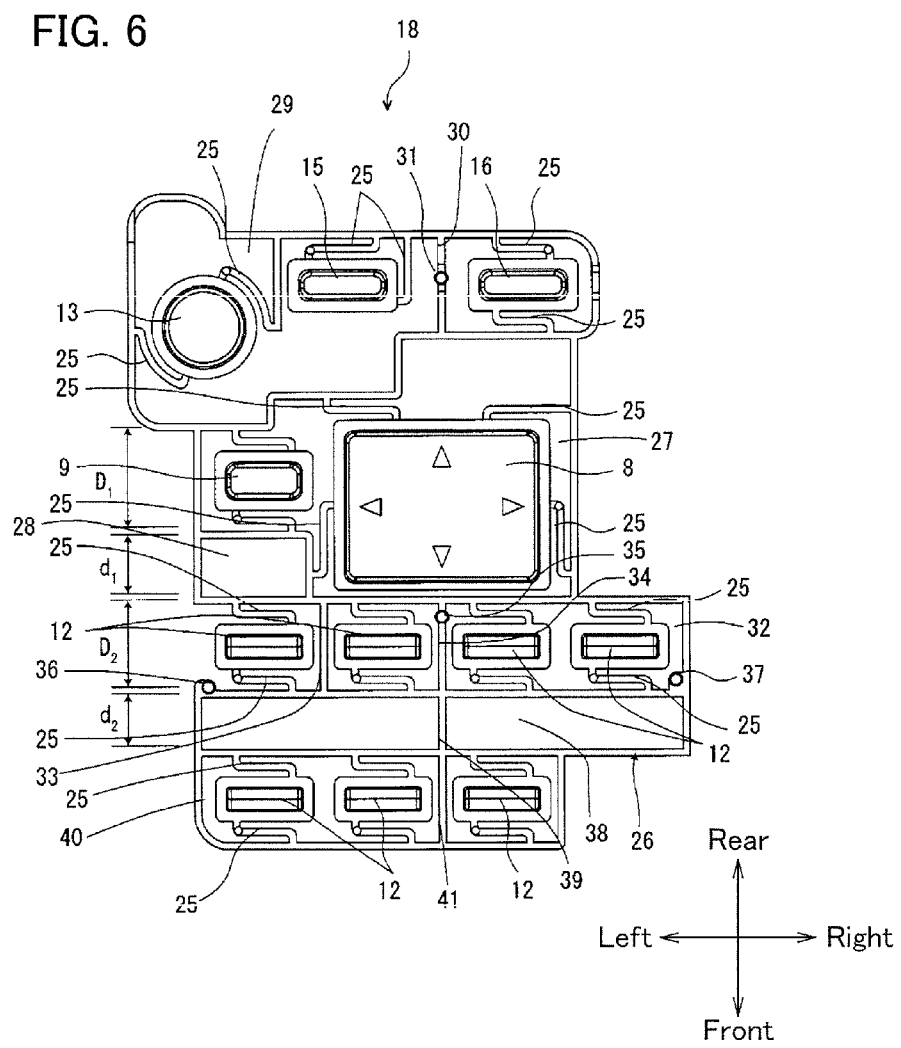
FIG. 6 is a plan view showing the first button key unit in the button key assembly according to the embodiment of the present disclosure.

As shown in FIG. 5 and FIG. 6, the first button key unit 18 includes a frame member 26 configured to support the button keys 8, 9, 12, 13, 15 and 16 arranged on the substrate 17 corresponding to the plurality of switches via elastic arm members 25. The elastic arm members 25 are each formed integrally with the frame member 26 and is curved in the shape of a letter "S", for example. The frame member 26 is partitioned with plastic panels to form a plurality of spaces.

A first supporting space 27 is formed at a center of the frame member 26 for supporting the up/down/right/left operation key 8 and the first button key 9. In the first supporting space 27, the up/down/right/left operation key 8 is supported by the frame member 26 via two pieces of elastic arm members 25 connected to a rear surface and two pieces of elastic arm members 25 connected to right and left sides of the up/down/right/left operation key 8, respectively. The first button key 9 is supported by the frame member 26 via elastic arm members 25 connected to a rear side and a front side of the first button key 9, respectively. In addition, a first vacant space 28 is formed adjacent to a portion of the first supporting space 27 where the elastic arm member 25 is arranged at the front side of the first button key 9. A width $d_1$ of the first vacant space 28 is configured to be narrower than a width $D_1$ of a space supporting the first button key 9, which is a part of the first supporting space 27.

A second supporting space 29, which is for supporting the menu key 13 and the right and left second button keys 15 and 16, is formed at a portion adjacent to the first supporting space 27 at a rear side of the frame member 26. In the second supporting space 29, the menu key 13 is supported by the frame member 26 via elastic arm members 25 connected to a rear side surface and a front side surface of the menu key 13, respectively. The second button key 15 at the left side is supported by the frame member 26 via elastic arm members 25 connected to a rear side surface and a right side surface of the second button key 15, respectively. The second button key 16 at the right side is supported by the frame member 26 via elastic arm members 25 connected to a rear side surface and a front side surface of the second button key 16, respectively. In addition, a partition member 30 is provided between the left second button key 15 and the right second button key 16. A first projection portion 31 is formed on the partition member 30.

A third supporting space 32 for supporting four pieces of third button key 12 in the first row is formed adjacent to the first supporting space 27 at a front side of the frame member 26. In the third supporting space 32, each third button key 12 is supported by the frame member 26 via elastic arm members 25 connected to a rear side surface and a front side surface of each third button key 12, respectively. Partition members 33 and 34 are bridged in a front-rear direction between a leftmost third button key 12 and a third button key 12 second from the left and between the third button key 12 second from the left and a third button key 12 third from the left, respectively. A second projection portion 35 is formed on the partition member 34 between the third button key 12 second from the left and the third button key 12 third from the left. In addition, a third projection portion 36 and a fourth projection portion 37 are formed respectively at right and left corner portions of the frame member 26 at a front side of the third supporting space 32.

A second vacant space 38 is formed adjacent to the elastic arm members 25 at front sides of the third button keys 12 in the third supporting space 32. A width $d_2$ of the second vacant space 38 is configured to be narrower than a width $D_2$ of the third supporting space 32. In addition, the second vacant space 38 is divided into right and left parts by a partition member 39 formed aligned with the partition member 34 of the third supporting space 32.

A fourth supporting space 40 for supporting three pieces of third button key 12 at the third row are formed adjacent to the frame member 26 at a front side of the second vacant space 38. Each third button key 12 is supported by the frame member 26 via elastic arm members 25 connected to a rear side surface and a front side surface of each third button key 12, respectively. A partition member 41 is bridged in the front-rear direction between a third button key 12 second from the left and a third button key 12 third from the left. This partition member 41 is formed aligned with the partition member 39 of the second vacant space 38.

Figure 7:
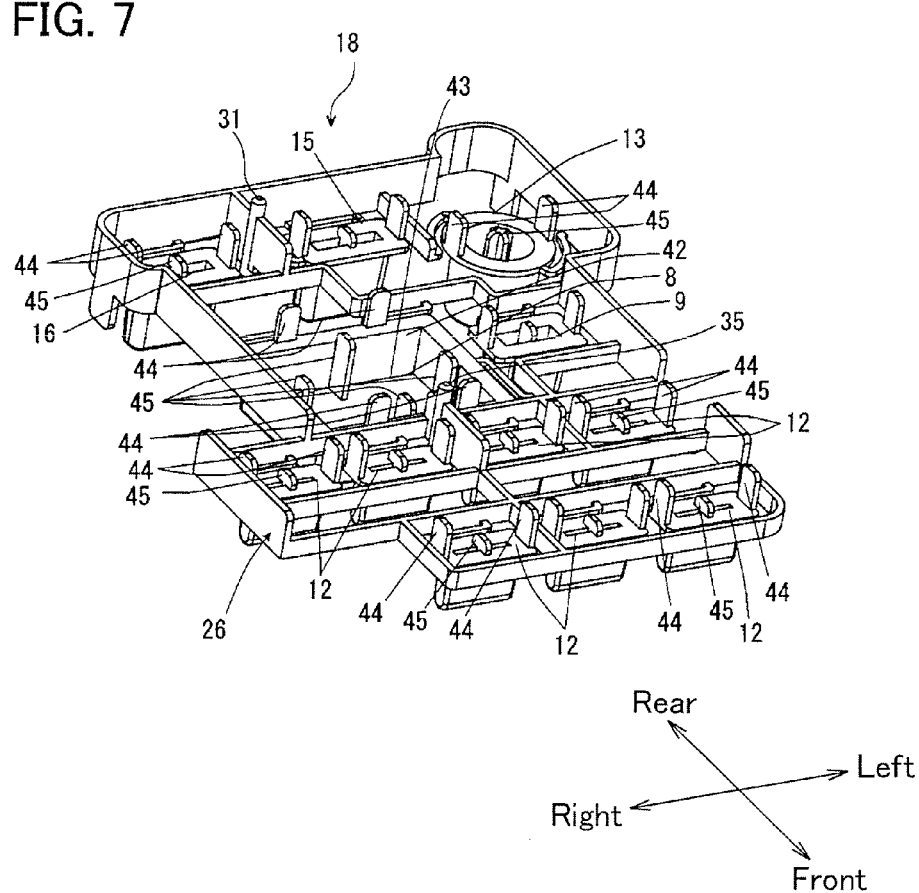
FIG. 7 is a perspective view showing a rear side of the first button key unit in the button key assembly according to the embodiment of the present disclosure.

As shown in FIG. 7, a concave portion 43 is formed by an outer peripheral surface 42 at a rear side of the up/down/right/left operation key 8. Two leg pieces 44 facing each other project from each undersurface of rear side surface and front side surface of the outer peripheral surface 42. In addition, projection pieces 45 are arranged at the concave portion 43 in a shape of a lozenge so as to correspond to tact switches 22, respectively. Furthermore, a pair of leg pieces 44 facing each other right and left is provided at a rear side of each of the first button key 9 in the upper row, third button keys 12, the menu key 13, and the left and right second button keys 15 and 16. A projection piece 45 is formed between the pair of right and left leg pieces 44 so as to correspond to each of the tact switches 21 and 23.

Figure 8:
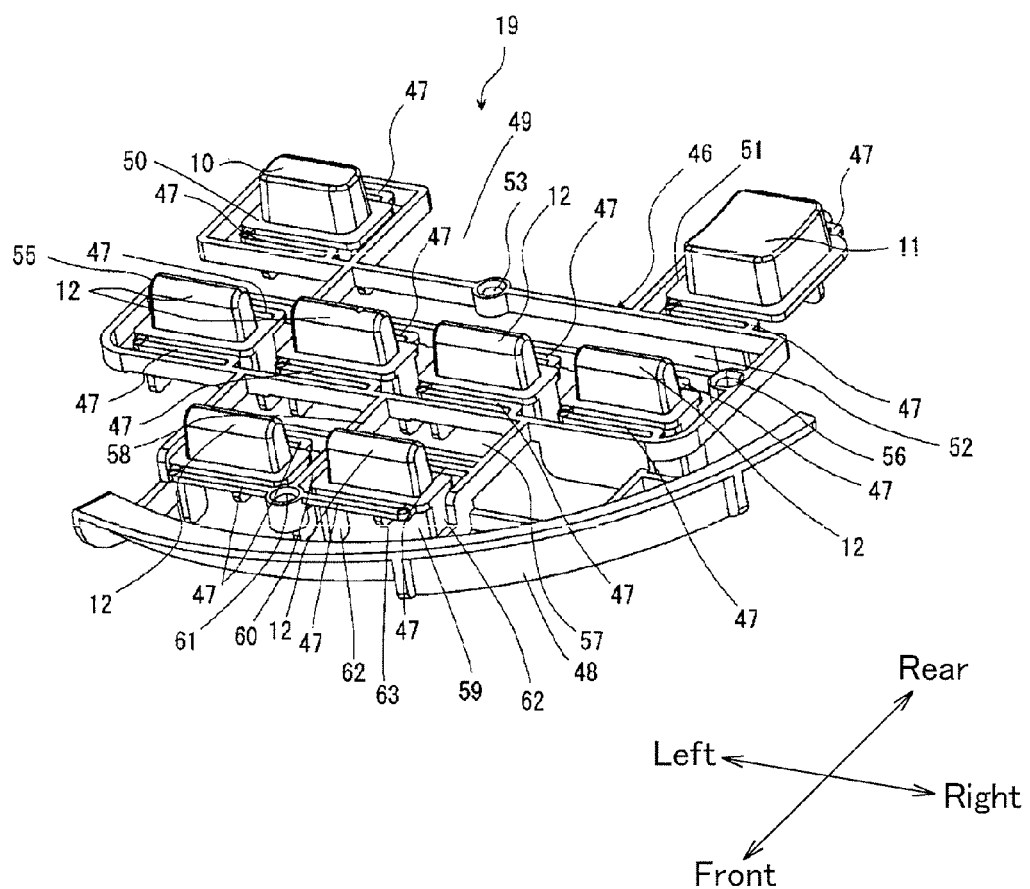
FIG. 8 is a perspective view showing a second button key unit in the button key assembly according to the embodiment of the present disclosure.
Figure 9:
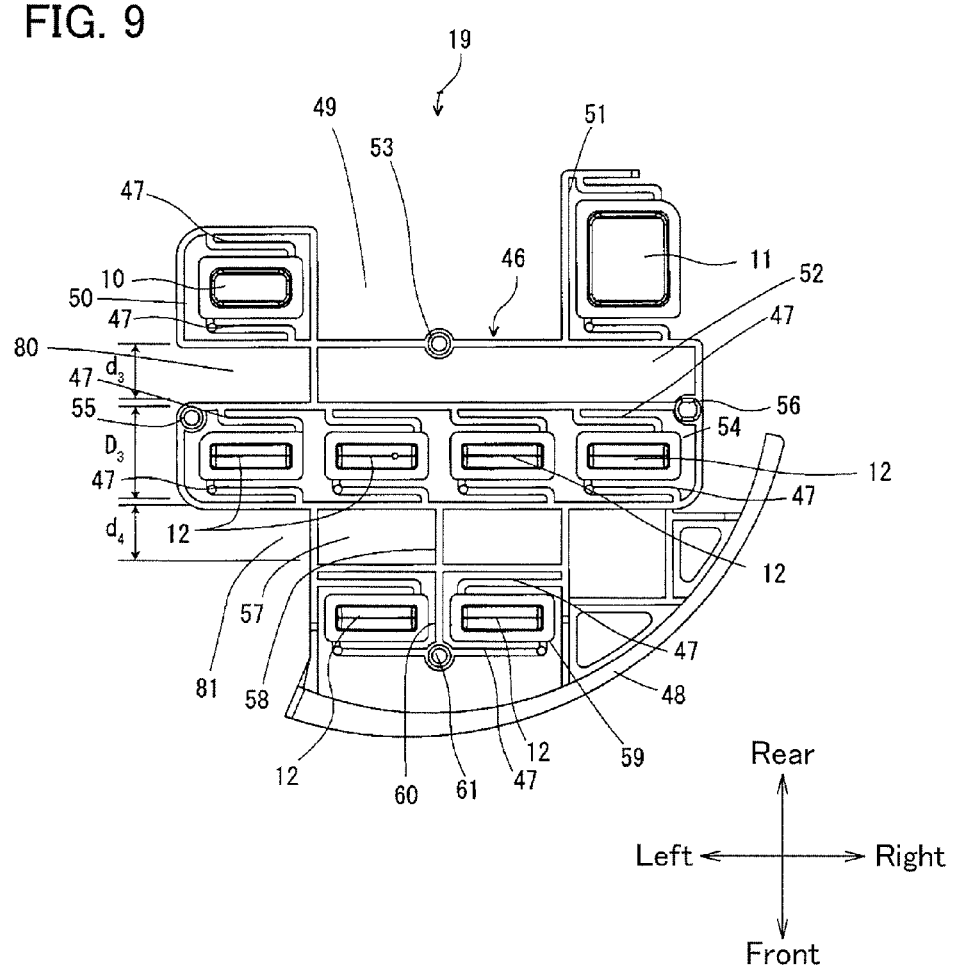
FIG. 9 is a plan view showing the second button key unit in the button key assembly according to the embodiment of the present disclosure.

As shown in FIG. 8 and FIG. 9, the second button key unit 19 includes a frame member 46 configured to support the button keys 10, 11, and 12 arranged corresponding to the plurality of switches on the substrate 17 via elastic arm members 47. The frame member 46 is partitioned with plastic panels to form a plurality of spaces. A portion 48 curved in arc from a right side to a front side is formed to be compatible in shape with the cover 20 in the frame member 46. In addition, the elastic arm members 47 are formed integrally with the frame member 46 and in a shape bent like a letter "S", for example.

A third vacant space 49 is formed in a central rear side of the frame member 46 for arranging the up/down/right/left operation key 8 supported by the frame member 26 of the first button key unit 18. A fourth supporting space 50 for supporting the first button key 10 is formed at a left side of the third vacant space 49. A fifth supporting space 51 for supporting the second button key 11 is formed at a right side of the third vacant space 49. In the fourth supporting space 50, the first button key 10 is supported by the frame member 46 via elastic arm members 47 connected to a rear side surface and a front side surface of the first button key 10, respectively. In addition, in the fifth supporting space 51, the second button key 11 is supported by the frame member 46 via elastic arm members 47 connected to a rear side surface and a front side surface of the second button key 11, respectively.

A fourth vacant space 52 is formed adjacent to the third vacant space 49 and the fourth and fifth supporting spaces 50 and 51 of the frame member 46. A first hole portion 53 of a cylindrical shape is formed on the frame member 46 between the third vacant space 49 and the fourth vacant space 52, such that it corresponds to the second projection portion 35 of the first button key unit 18. The second projection portion 35 is configured to fit into the first hole portion 53.

A sixth supporting space 54 for supporting four pieces of third button key 12 in the second row is formed at a front side of the fourth vacant space 52 of the frame member 46. In the sixth supporting space 54, each third button key 12 is supported by the frame member 46 via elastic arm members 47 connected to a rear side surface and a front side surface of each third button key 12, respectively. As shown in FIG. 9, a width $d_3$ of the fourth vacant space 52 is configured to be narrower than a width $D_3$ of the sixth supporting space 54. A second hole portion 55 and a third hole portion 56 of a cylindrical shape are formed at respective right and left corners of the frame member 46 between the fourth vacant space 52 and the sixth supporting space 54, such that the second hole portion 55 and third hole portion 56 correspond to the third projection portion 36 and the fourth projection portion 37 of the first button key unit 18, respectively. The third projection portion 36 and the fourth projection portion 37 are configured to fit into the second hole portion 55 and the third hole portion 56, respectively.

A fifth vacant space 57 is formed adjacent to the sixth supporting space 54 at a front side of third button keys 12. A width $d_4$ of the fifth vacant space 57 is configured to be narrower than the width $D_3$ of the sixth supporting space. In addition, the fifth vacant space 57 is divided into right and left parts by a partition member 58.

A seventh supporting space 59 for supporting two pieces of third button key 12 at right and left in the fourth row is formed on the frame member 46 at a front side of the fifth vacant space 57. Each third button key 12 is supported by the frame member 46 via elastic arm members 47 connected to a rear side surface and a front side surface of each third button key 12, respectively. A partition member 60 is formed aligned with the partition member 58 of the fifth vacant space 57 between the left and right third button keys 12. A fourth hole portion 61 of a cylindrical shape is formed at a front end side of the partition member 60.

As shown in FIG. 8, a pair of leg pieces 62 facing each other left and right projects from a rear side of each of the first button key 10, the second button key 11, and the third button keys 12. A projection piece 63 is formed between the pair of leg pieces 62 so as to correspond to each of the tact switches 23.

Figure 10:
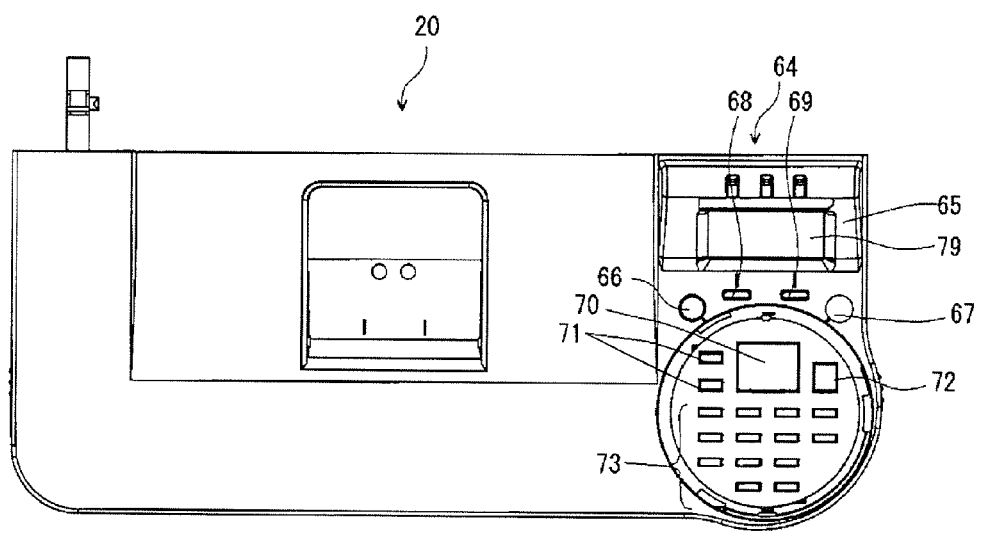
FIG. 10 is a plan view showing a cover in the button key assembly according to the embodiment of the present disclosure.
Figure 10:
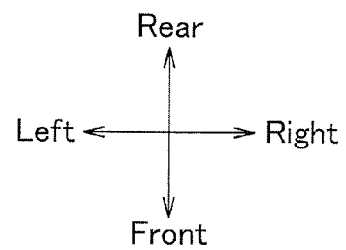

As shown in FIGS. 2 and 10, the cover 20 has a substantially oblong rectangular shape in planar view. Corner portions at front right and left sides of the cover 20 are each curved in an arc shape. On a right side of the cover 20, an operation panel cover 64 is formed so as to cover the button key assembly of the operation panel 5. A rear side of the operation panel cover 64 projects upward so as to cover the display unit 6. An opening 79 of a rectangular shape is formed at a front sloping portion 65. In addition, openings 66, 67, 68, and 69 into which the menu key 13, the cancel key 14, and the second button keys 15 and 16 are respectively insertable with clearance are formed at a front side with respect to the front sloping portion 65 of the operation panel cover 64 and outside the concave portion 7. Furthermore, openings 70, 71, 72, and 73 into which the up/down/right/left operation key 8, the first button keys 9 and 10, the second button key 11, and the third button keys 12 are respectively insertable with clearance are formed inside the concave portion 7 of the operation panel cover 64.

Figure 11:
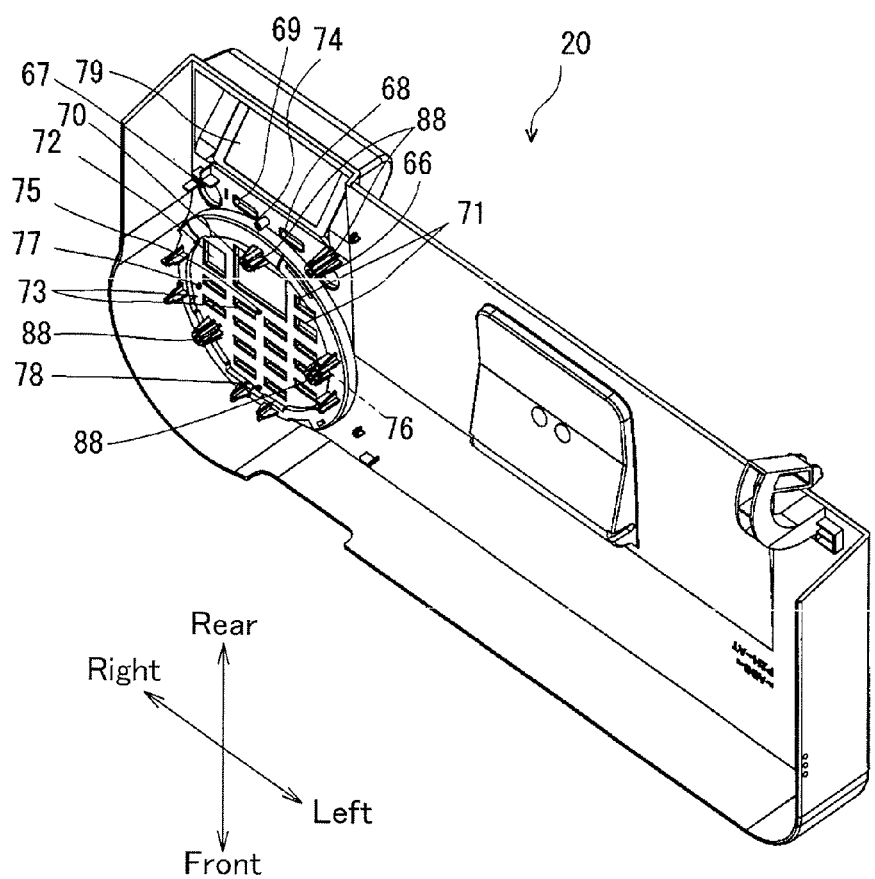
FIG. 11 is a perspective view showing a rear side of the cover in the button key assembly according to the embodiment of the present disclosure.

As shown in FIG. 11, an engagement concave portion 74 of a cylindrical shape projects to correspond to the first projection portion 31 of the first button unit 18 at a rear side of the cover 20. Engagement convex portions 75, 76, 77, and 78 project to correspond to the first to fourth hole portions 53, 55, 56, and 61 of the second button unit 19, respectively. In addition, bosses 88 each having a threaded hole project from four locations to correspond to the mounting holes 84, 85, 86, and 87 of the substrate 17, respectively.

When the operation panel 5 including the above setup is assembled, the first and second projection portions 31 and 35 of the first button key unit 18 shown in FIG. 7 are first inserted into the positioning holes 82 and 83 on the substrate 17 shown in FIG. 4. Accordingly, the first button key unit 18 is superposed on the substrate 17. The positioning hole 82 is a circular hole having the same diameter as the second projection portion 35. On the other hand, the positioning hole 83 is an oblong hole of a width having the same dimension as the diameter of the first projection portion 31. A lower end of the superposed frame member 26 comes into contact with the substrate 17. Moreover, lower end portions of a pair of leg pieces 44 of each of the up/down/right/left operation key 8, the first button key 9 in the upper row, the third button keys 12, the menu key 13, and the left and right second button keys 15 and 16 face each other on the substrate 17 at a predetermined interval. As a result, the first button key unit 18 is supported on the substrate 17, such that a projection piece 45 between each pair of leg pieces 44 is slightly spaced apart from each of the tact switches 21, 22 and 23.

Figure 12:
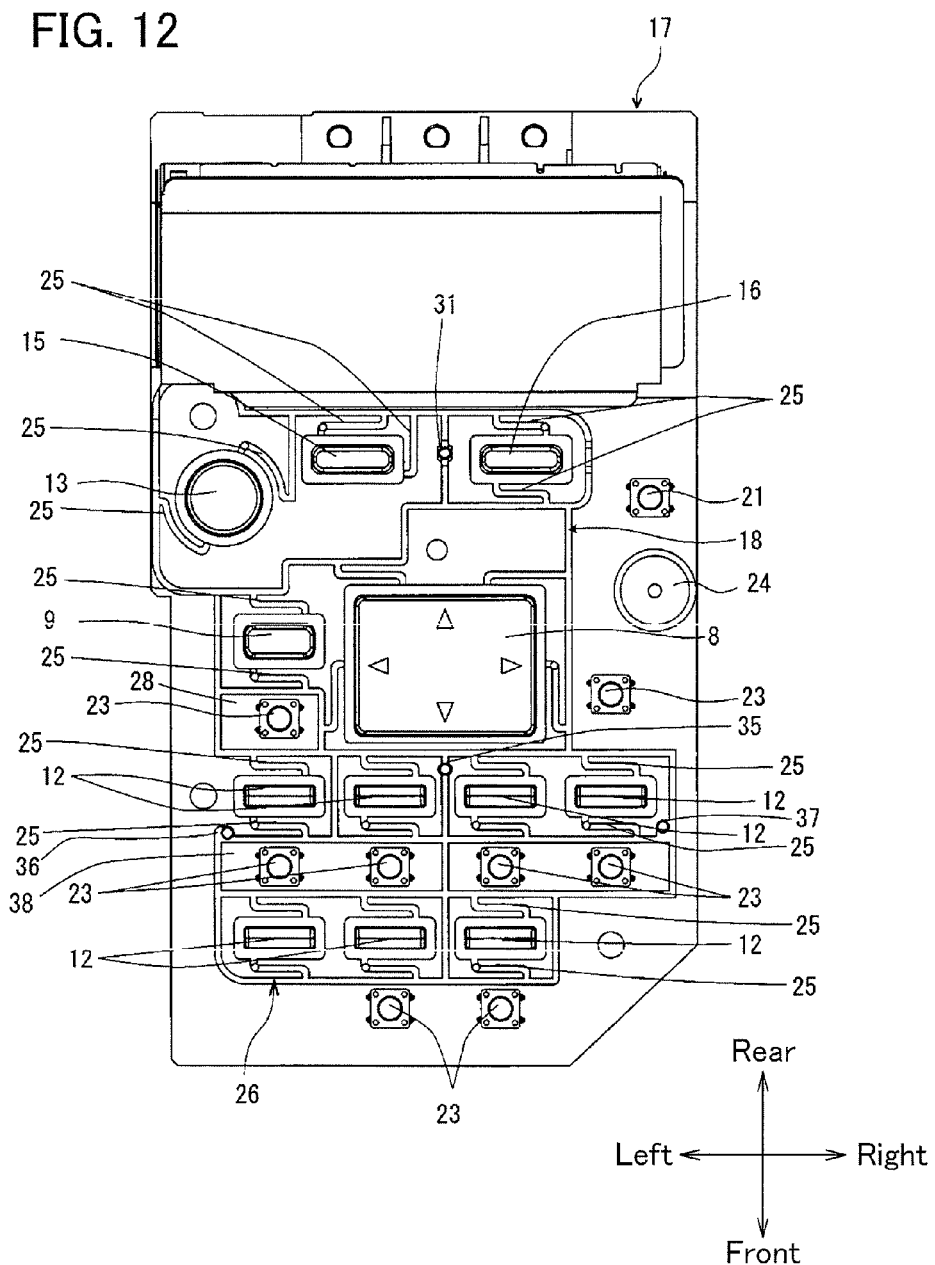
FIG. 12 is a plan view showing the first button key unit superposed on the substrate in the button key assembly according to the embodiment of the present disclosure.

In this manner, as shown in FIG. 12, the menu key 13 and the second button keys 15 and 16 are arranged above three tact switches 21, respectively. The up/down/right/left operation key 8 is arranged above four tact switches 22 arranged in a lozenge shape. The first button key 9 at the upper side, the four pieces of third button key 12 in the first row, and the three pieces of third button key 12 in the third row are arranged above eight tact switches 23. In addition, a tact switch 23 for the first button key 10 at the lower side is arranged in the first vacant space 28. Tact switches 23 for the four pieces of third button key 12 in the second row are arranged in the second vacant space 38. Furthermore, a tact switch 21, a buzzer 24, and a tact switch 23 are arranged at a right outer side of the first button key unit 18, in order from a rear side to a front side. Tact switches 23 are arranged in parallel with each other to the right and left at a front outer side of the first button key unit 18.

Next, the second button key unit 19 is superposed on the first button key unit 18 by fitting the projection portion of the first button key unit 18 into the hole portion of the second button key unit 19. More specifically, the second button key unit 19 is superposed on the first button key unit 18 by fitting the first hole portion 53 with the second projection portion 35, and fitting the second hole portion 55 and the third hole portion 56 with the third projection portion 36 and the fourth projection portion 37, respectively. Accordingly, an upper end of the frame member 26 and a lower end of the frame member 46 come into contact with each other at a plurality of locations. Then, lower end portions of a pair of leg pieces 62 of each of the first button key 10, the second button key 11, and the third button keys 12 shown in FIG. 8 face each other on the substrate 17 at a predetermined interval. As a result, the second button key unit 19 is supported on the substrate 17 and the first button key unit 18, such that a projection piece 63 between each pair of leg pieces 62 is slightly spaced apart from each of the tact switches 23.

Figure 13:
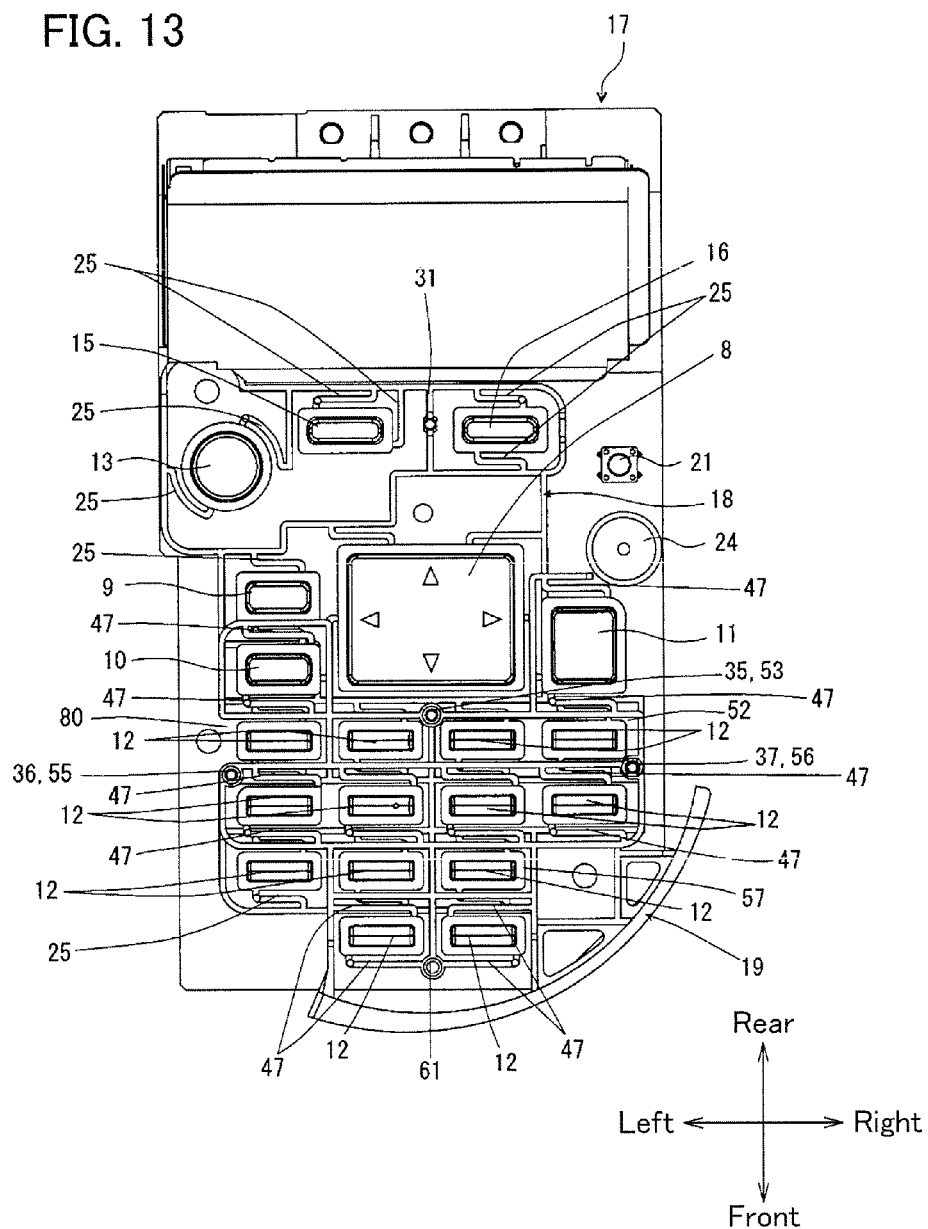
FIG. 13 is a plan view showing the first button key unit and the second button key unit superposed on the substrate in the button key assembly according to the embodiment of the present disclosure.

In this manner, as shown in FIG. 13, the first button key 10 of the second button key unit 19, the second button key 11, four pieces of third button key 12 in the second row, and two pieces of third button key 12 in the fourth row are arranged above the eight pieces of tact switches 23 of the substrate 17, respectively. In addition, an operation key or a button key of the first button key unit 18 is arranged in vacant spaces of the second button key unit 19. More specifically, the up/down/right/left operation key 8 is arranged in the third vacant space 49. Four pieces of third button key 12 in the first row are arranged in the fourth vacant space 52 and the space 80 to the left of the fourth vacant space 52. Three pieces of third button key 12 in the third row are arranged in the fifth vacant space 57 and a space 81 to the left of the fifth vacant space 57.

Next, by covering the button key assembly subjected to the steps described above with the cover, the first projection portion 31 of the first button key unit 18 shown in FIG. 5 fits into the engagement concave portion 74 of the cover 20 shown in FIG. 11. Then, a screw is inserted into the mounting hole 84 of the substrate 17 shown in FIG. 4 to fasten the corresponding boss 88 shown in FIG. 11. Since the mounting hole 84 has the same diameter as the screw, the substrate 17 is positioned with respect to the boss 88. Upon the positioning, even if there is a relative dimensional tolerance between the engagement concave portion 74 and the boss 88 in a plane intersecting a direction of engagement of the engagement concave portion 74 and the boss 88, this tolerance will be absorbed. The reason for this is that the substrate 17 slides with respect to the first projection portion 31 since the positioning hole 83 is oblong. In addition, since the first projection portion 31 is positioned at the concave portion 74 of the cover 20 and the projection portion 35 is positioned at the positioning hole 82 of the substrate 17, it is possible to stabilize the position and the posture.

Then, as shown in FIG. 2, the display unit 6 is exposed through the opening 79. And the up/down/right/left operation key 8, the first button keys 9 and 10, the second button key 11, and the third button keys 12 project upwards through the openings 70, 71, 72, and 73, respectively, inside the concave portion 7. The menu key 13, the cancel key 14, and the second button keys 15 and 16 project upwards through the openings 66, 67, 68, and 69, respectively, outside the concave portion 7. It should be noted that, at this time, the cancel key 14 projects upwards through the opening 67 shown in FIG. 10, while being supported independently.

Alternatively, it may be possible to adopt assembly steps different from what has been described. For example, the second button key unit 19 is first attached to the cover 20, the first button key unit 18 is next attached thereon, and the substrate 17 is further attached thereon.

Thereafter, descriptions of various button keys (not illustrated) are placed on the concave portion 7, and a transparent sheet made of polycarbonate (not illustrated) is placed on the descriptions. The descriptions and the sheet are fixed with a circular ring (not illustrated) fitted with the inner circumference of the concave portion 7.

According to the button key assembly of the embodiment of the present disclosure, the second button key unit 19 is superposed onto the first button key unit 18, and the button keys are arranged in the vacant spaces having narrower widths than the supporting spaces of the button keys. Accordingly, since the elastic arm members 25 of the first button key unit 18 and the elastic arm members 47 of the second button key unit 19 are arranged at different positions in a vertical direction, it is possible to overlap the elastic arm members 25 with the elastic arm members 47 in a direction intersecting the vertical direction. As a result, since it is possible to reduce pitches between the button keys and reduce an area for laying them out, it is possible to downsize the operation panel. In addition, even if the pitches between the button keys are small, it is possible to secure sufficient flat spaces to install individual elastic arm members and sufficient clearances between the button keys and the switches. In this manner, since a pressed button key smoothly comes into contact with a switch arranged directly under the button key, it is unlikely that operability and functionality are impaired.

It should be noted that although the above embodiment adopts an exemplary setup in which two button key units are superposed each other, the present disclosure is not limited to this setup. It may be alternatively possible to apply the present disclosure to setups in which three or more button key units are superposed each other.

In addition, since the above description has been provided for an example of preferable embodiment of the button key assembly according to the present disclosure, it may be that various technically preferable limitations have been presented in describing the shape of the frame member and the arrangement of the button keys, for example. However, the technical scope of the present disclosure is not limited to the embodiment described above as long as there is no description that limits the present disclosure in particular. Furthermore, the elements in the above-described embodiment of the present disclosure may be replaced with, for example, existing elements as necessary. Also, it may be possible to carry out various variations including combinations with other existing elements. The content of the disclosure described in the claims will not be limited by the above descriptions of the embodiment of the present disclosure.

The invention claimed is:

1. An operation panel comprising:
a cover including a plurality of openings;
two button key units each including a plurality of button keys; and
a substrate including switches configured to operate in response to pushing the plurality of button keys, the substrate being configured to support the two button key units which are superposed with each other between the substrate and the cover,
wherein each of the two button key units includes:
  a plurality of button keys disposed to correspond geometrically to the switches provided at the substrate;
  a frame member configured to have a plurality of spaces partitioned by plastic partition members such that the plurality of spaces are arranged coplanar in a common plane and to support the plurality of button keys by a plurality of elastic members such that the plurality of button keys projects through the plurality of openings of the cover; and
  a supporting space and a vacant space, the supporting space being configured to have a width allowing at least a button key to be supported via a pair of elastic members, the vacant space being disposed adjacent to the supporting space with a partition member being interposed therebetween and a width of the vacant space being configured to be smaller than the width of the supporting space,
wherein the vacant space of one button key unit of the two button key units is configured to be insertable of at least one button key of the other button key unit on which the one button key unit is superposed,
wherein the other button key unit is configured to include a first fitting portion which mates with one button key unit and a second fitting portion which mates with the substrate,
wherein the one button key unit is configured to include a third fitting portion which is positioned through mating with the cover and a fourth fitting portion which is positioned through mating with the first fitting portion of the other button key unit,
wherein the substrate is configured to include positioning portions to position the substrate with respect to the cover,
wherein the first fitting portion and the second fitting portion are configured to be located at a same position with respect to a horizontal direction of the common plane, and the third fitting portion and the fourth fitting portion are configured to be located at a same position with respect to the horizontal direction of the common plane;
wherein:
  the first fitting portion and the second fitting portion are projections provided at the partition member, respectively;
  the third fitting portion and the fourth fitting portion are cylindrical holes, respectively;
  a positioning hole to mate with the first fitting portion is provided at the substrate; and
  a projection to mate with the third fitting portion is provided at the cover.

2. An operation panel comprising:
a cover including a plurality of openings;
two button key units each including a plurality of button keys; and
a substrate including switches configured to operate in response to pushing the plurality of button keys, the substrate being configured to support the two button key units which are superposed with each other between the substrate and the cover,
wherein each of the two button key units includes:
  a plurality of button keys disposed to correspond geometrically to the switches provided at the substrate;
  a frame member configured to have a plurality of spaces partitioned by plastic partition members such that the plurality of spaces are arranged coplanar in a common plane and to support the plurality of button keys by a plurality of elastic members such that the plurality of button keys projects through the plurality of openings of the cover; and
  a supporting space and a vacant space, the supporting space being configured to have a width allowing at least a button key to be supported via a pair of elastic members, the vacant space being disposed adjacent to the supporting space with a partition member being interposed therebetween and a width of the vacant space being configured to be smaller than the width of the supporting space,
wherein the vacant space of one button key unit of the two button key units is configured to be insertable of at least one button key of the other button key unit on which the one button key unit is superposed,
wherein the other button key unit is configured to include a first fitting portion which mates with the one button key unit and a second fitting portion which mates with the substrate,
wherein the one button key unit is configured to include a third fitting portion which is positioned through mating with the cover and a fourth fitting portion which is positioned through mating with the first fitting portion of the other button key unit,
wherein the substrate is configured to include positioning portions to position the substrate with respect to the cover,
wherein the first portion and the second fitting portion are configured to be located at a same position with respect to a horizontal direction of the common plane, and the third fitting portion and the fourth fitting position are configured to be located at a same position with respect to the horizontal direction of the common plane, and
wherein the one button key unit includes a fifth fitting position portion configured to be positioned through mating with the cover.

3. The operation panel according to claim 2, wherein
the first fitting portion and the second fitting portion are projections provided at the partition member, respectively,
the third fitting portion and the fourth fitting portion are cylindrical holes, respectively,
a positioning hole to mate with the first fitting portion is provided at the substrate, and
a projection to mate with the third fitting portion is provided at the cover.

4. An image forming apparatus comprising: an operation panel,
wherein the operation panel comprises:
a cover including a plurality of openings;
two button key units each including a plurality of button keys; and
a substrate including switches configured to operate in response to pushing the plurality of button keys, the substrate being configured to support the two button key units which are superposed with each other between the substrate and the cover,
wherein each of the two button key units includes:
a plurality of button keys disposed to correspond geometrically to the switches provided at the substrate;
a frame member configured to have a plurality of spaces partitioned by plastic partition members such that the plurality of spaces are arranged coplanar in a common plane and to support the plurality of button keys by a plurality of elastic members such that the plurality of button keys projects through the plurality of openings of the cover; and
a supporting space and a vacant space, the supporting space being configured to have a width allowing at least a button key to be supported via a pair of elastic members, the vacant space being disposed adjacent to the supporting space with a partition member being interposed therebetween and a width of the vacant space being configured to be smaller than the width of the supporting space,
wherein the vacant space of one button key unit of the two button key units is configured to be insertable of at least one button key of the other button key unit on which the one button key unit is superposed,
wherein the other button unit is configured to include a first fitting portion which mates with the one button key unit and a second fitting portion which mates with the substrate,
wherein the one button key unit is configured to include a third fitting portion which is positioned through mating with the cover and a fourth fitting portion which is positioned through mating with the first fitting portion of the other button key unit,
wherein the substrate is configured to include positioning portions to position the substrate with respect to the cover, and
wherein the first fitting portion and the second fitting portion are configured to be located at a same position with respect to a horizontal direction of the common plane, and the third fitting portion and the fourth fitting portion are configured to be located at a same position with respect to the horizontal direction of the common plane;
wherein:
the first fitting portion and the second fitting portion are projections provided at the partition member, respectively;
the third fitting portion and the fourth fitting portion are cylindrical holes, respectively;
a positioning hole to mate with the first fitting portion is provided at the substrate; and
a projection to mate with the third fitting portion is provided at the cover.

5. The image forming apparatus according to claim 4,
wherein the one button key unit includes a fifth fitting portion configured to be positioned though mating into the cover.

\* \* \* \* \*